(12) United States Patent
Yu

(10) Patent No.: US 11,314,126 B2
(45) Date of Patent: Apr. 26, 2022

(54) BACKLIGHT MODULE AND LIQUID CRYSTAL DISPLAY DEVICE

(71) Applicant: Wuhan China Star Optoelectronics Technology Co., Ltd., Hubei (CN)

(72) Inventor: Pengfei Yu, Hubei (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 292 days.

(21) Appl. No.: 16/623,586

(22) PCT Filed: Nov. 5, 2019

(86) PCT No.: PCT/CN2019/115715
§ 371 (c)(1),
(2) Date: Dec. 17, 2019

(87) PCT Pub. No.: WO2021/017249
PCT Pub. Date: Feb. 4, 2021

(65) Prior Publication Data
US 2021/0033923 A1  Feb. 4, 2021

(30) Foreign Application Priority Data
Jul. 30, 2019  (CN) .......................... 201910693256.8

(51) Int. Cl.
*G02F 1/13357*  (2006.01)
*G02F 1/00*  (2006.01)

(52) U.S. Cl.
CPC ...... *G02F 1/133603* (2013.01); *G02F 1/0009* (2013.01); *G02F 1/133606* (2013.01)

(58) Field of Classification Search
None
See application file for complete search history.

(56) References Cited

FOREIGN PATENT DOCUMENTS

| CN | 102338297 A | * | 2/2012 |
|---|---|---|---|
| CN | 102338297 A |   | 2/2012 |
| CN | 103487857 A |   | 1/2014 |
| CN | 103592706 A |   | 2/2014 |
| CN | 106461820 A |   | 2/2017 |
| CN | 107434892 A | * | 12/2017 |
| CN | 208026896 U | * | 10/2018 |
| CN | 109946772 A |   | 6/2019 |
| CN | 110007382 A |   | 7/2019 |
| KR | 20100001581 A | * | 1/2010 |
| KR | 20100001582 A | * | 1/2010 |
| KR | 20120049650 A |   | 5/2012 |

* cited by examiner

*Primary Examiner* — Britt D Hanley
(74) *Attorney, Agent, or Firm* — The Roy Gross Law Firm, LLC; Roy Gross

(57) ABSTRACT

A backlight module and a liquid crystal display device are provided. By forming a diffusion layer on a light emitting surface of each of a plurality of light emitting diodes (LEDs), a light shadow and a LED light path generated by misalignment between the LEDs and a light guide plate and deformation of a reflective sheet can be effectively avoided. The backlight module emits light of uniform brightness to improve display performance of the liquid crystal display device.

18 Claims, 1 Drawing Sheet

BACKLIGHT MODULE AND LIQUID CRYSTAL DISPLAY DEVICE

FIELD OF INVENTION

The present disclosure relates to the field of display technologies, and more particularly to a backlight module and a liquid crystal display device.

BACKGROUND OF INVENTION

Display mechanism of liquid crystal displays (LCDs) is based on backlight modules providing white light, and liquid crystal display panels receive white light and obtain colorful display images through light imaging principle of the liquid crystal display panels.

Side-lit liquid crystal display devices include a plurality of light emitting diodes (LEDs) arranged side by side as point light sources. When the liquid crystal display devices are in operation, a plurality of light emitting diodes are simultaneously illuminated, and point light sources are dispersed as surface light sources to provide backlights for the liquid crystal display panels by a combination of light guide plates (LGPs) and diffusion films. Because a LED light bar is composed of a plurality of LEDs, the LED light bar and the LGP are misaligned, so that there is a non-light source area with a certain distance between adjacent LEDs, and when a reflection sheet on a side of the LEDs is deformed, a certain distance of the non-light source area and the deformation of the reflection sheet on the side of the LEDs will cause the liquid crystal display device to form a clear LED light path and a light shadow on a light incident side during operation, which affects display performance of the liquid crystal display device.

SUMMARY OF INVENTION

An objective of the present application is to provide a backlight module and a liquid crystal display device, which solve issues that a clear light emitting diode (LED) light path and a light shadow are formed on a light incident side when the liquid crystal display device operates.

An embodiment of the present disclosure provides a backlight module. The backlight module includes a plurality of light emitting diodes (LEDs) each having a light emitting surface. The light emitting surface of each of the LEDs is provided with a diffusion layer.

In an embodiment of the present disclosure, the diffusion layer includes a transparent adhesive and light diffusion particles.

In an embodiment of the present disclosure, the light diffusion particles include organic light diffusion particles and inorganic light diffusion particles.

In an embodiment of the present disclosure, a ratio of a refractive index of the transparent adhesive to a refractive index of the organic light diffusion particles ranges from 1.05 to 1.08.

In an embodiment of the present disclosure, a ratio of a refractive index of the transparent adhesive to a refractive index of the inorganic light diffusion particles ranges from 0.93 to 0.98.

In an embodiment of the present disclosure, a number of the organic light diffusion particles is greater than a number of the inorganic light diffusion particles.

In an embodiment of the present disclosure, the transparent adhesive is at least one selected from a group consisting of epoxy resins and silicones.

In an embodiment of the present disclosure, the organic light diffusion particles are at least one selected from a group consisting of acrylates, silicones, and polyethylenes, and the inorganic light diffusion particles are at least one selected from a group consisting of barium sulfate, silica, and calcium carbonate.

In an embodiment of the present disclosure, the backlight module is a side-lit backlight module.

In an embodiment of the present disclosure, the diffusion layer includes a first diffusion layer and a second diffusion layer, the first diffusion layer is disposed between the light emitting surface of each of the LEDs and the second diffusion layer, the first diffusion layer includes first light diffusion particles each having a first diameter, the second diffusion layer includes second light diffusion particles each having a second diameter, the first diameter is greater than the second diameter, the first diameter is a diameter of a minimum sphere corresponding to the first light diffusion particle, and the second diameter is a diameter of a minimum sphere corresponding to the second light diffusion particle.

An embodiment of the present disclosure further provides a liquid crystal display device. The liquid crystal display device includes a backlight module. The backlight module includes a plurality of light emitting diodes (LEDs) each having a light emitting surface, and the light emitting surface of each of the LEDs is provided with a diffusion layer.

In an embodiment of the present disclosure, the diffusion layer includes a transparent adhesive and light diffusion particles.

In an embodiment of the present disclosure, the light diffusion particles include organic light diffusion particles and inorganic light diffusion particles.

In an embodiment of the present disclosure, a ratio of a refractive index of the transparent adhesive to a refractive index of the organic light diffusion particles ranges from 1.05 to 1.08.

In an embodiment of the present disclosure, a ratio of a refractive index of the transparent adhesive to a refractive index of the inorganic light diffusion particles ranges from 0.93 to 0.98.

In an embodiment of the present disclosure, a number of the organic light diffusion particles is greater than a number of the inorganic light diffusion particles.

In an embodiment of the present disclosure, the transparent adhesive is at least one selected from a group consisting of epoxy resins and silicones.

In an embodiment of the present disclosure, the organic light diffusion particles are at least one selected from a group consisting of acrylates, silicones, and polyethylenes, and the inorganic light diffusion particles are at least one selected from a group consisting of barium sulfate, silica, and calcium carbonate.

In an embodiment of the present disclosure, the backlight module is a side-lit backlight module.

In an embodiment of the present disclosure, the diffusion layer includes a first diffusion layer and a second diffusion layer, the first diffusion layer is disposed between the light emitting surface of each of the LEDs and the second diffusion layer, the first diffusion layer includes first light diffusion particles each having a first diameter, the second diffusion layer includes second light diffusion particles each having a second diameter, the first diameter is greater than the second diameter, the first diameter is a diameter of a minimum sphere corresponding to the first light diffusion particle, and the second diameter is a diameter of a minimum sphere corresponding to the second light diffusion particle.

Beneficial effects of an embodiment of the present disclosure are that, a backlight module and a liquid crystal display device are provided. By forming a diffusion layer on a light emitting surface of each of a plurality of LEDs, a distribution angle of light emitted by the LEDs is increased, and a brightness of light emitted from each direction of the LEDs is more uniform, this reaches a transition of the LEDs from a point source to a line source, eliminates a dark area between adjacent two LEDs, so that light entering a light guide plate is the same brightness light, thereby avoiding misalignment between the LEDs and the light guide plate, and also avoiding a LED light path and a light shadow generated by deformation of a reflection sheet, so as to enable the backlight module to emit light of uniform brightness, thereby improving display performance of the liquid crystal display device.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

Figure 1:
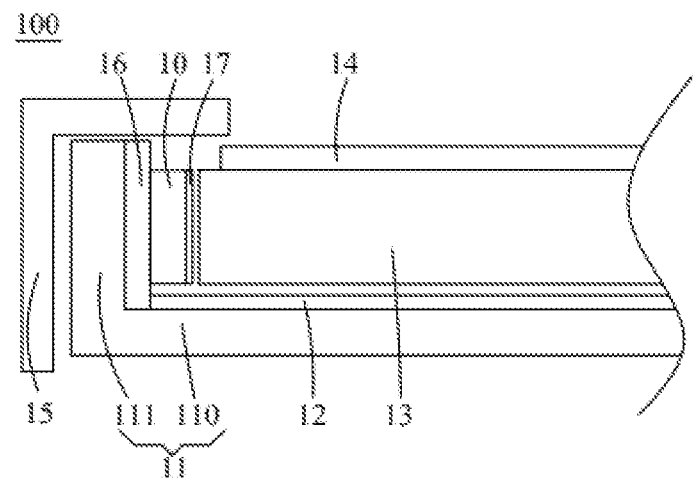
FIG. 1 is a schematic diagram of a backlight module according to an embodiment of the present application.
Figure 2:
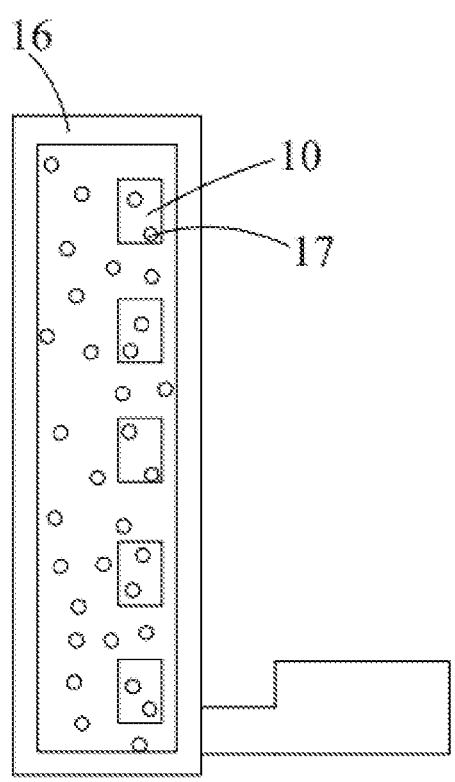
FIG. 2 is a schematic diagram of a plurality of light emitting diodes (LEDs) disposed on a printed circuit board of the backlight module illustrated in FIG. 1

Referring to FIG. 1 and FIG. 2, FIG. 1 is a schematic diagram of a backlight module according to an embodiment of the present application, and FIG. 2 is a schematic diagram of a plurality of light emitting diodes (LEDs) disposed on a printed circuit board of the backlight module illustrated in FIG. 1. The backlight module 100 is a side-lit backlight module. The backlight module 100 includes a plurality of LEDs 10, a back plate 11, a reflection sheet 12, a light guide plate 13, an optical film 14, a middle frame 15, a printed circuit board 16, and a diffusion layer 17.

The LEDs 10 serve as point sources, and the LEDs 10 are disposed on a circuit of the printed circuit board 16 by an adhesive. The LEDs 10 and the printed circuit board 16 constitute an LED light bar. The LED light bar is disposed on a sidewall 111 of the back plate 11, and a light emitting surface of each of the LEDs 10 faces a light incident surface of the light guide plate 13. Each of the LEDs 10 has the light emitting surface, and the light emitting surface of each of the LEDs is provided with the diffusion layer 17. A process of forming the diffusion layer 17 on the light emitting surface of each of the LEDs 10 is simplified by applying a diffusion layer over the entire LED light bar to form the diffusion layer 17 on the light emitting surface of each of the LEDs 10.

The light emitted by the LEDs 10 is disturbed and atomized by the diffusion layer 17. The diffusion layer 17 increases a distribution angle of the light emitted by each of the LEDs 10, and a brightness of the light emitted by the LEDs 10 is more uniform, thereby realizing the transition of the LEDs 10 from a point source to a line source. A dark area between adjacent two LEDs 10 is eliminated, so that the light entering the light guide plate 13 is light of the same brightness. Even if the LEDs 10 and the light guide plate 13 are misaligned, since the distribution angle of the light emitted by each of the LEDs 10 is increased, there is no dark area between the adjacent two LEDs 10 or the dark area is significantly reduced, so that there will be no dark areas formed on the light incident surface of the light guide plate 13. There will be no LED light path due to light from the LEDs being relatively bright and dark. Since the brightness of the light emitted by each of the LEDs 10 is better, even if the reflection sheet 12 is deformed, the brightness of the light reflected by the deformation reflection sheet 12 into the light guide plate 13 is not significantly affected, and the light path of the LEDs 10 and the light shadow are not generated.

The light guide plate 13 is for mixing the light emitted from the LEDs 10 and mixing the light to change the light incident to the light guide plate 13 into a surface light source. The light guide plate 13 is disposed in the back plate 11, and the reflection sheet 12 is disposed between the light guide plate 13 and a bottom plate 110 of the back plate 11. The light guide plate 13 has a light incident surface adjacent to the plurality of LEDs 10, and the optical film 14 is disposed on the light emitting surface of the light guide plate 13. The surface of the light guide plate 13 adjacent to the reflection sheet 12 is provided with dots (not shown). The middle frame 15 is fixed to the sidewall 111 of the back plate 11 for fixing a liquid crystal display panel or the like.

After the light emitted from the LEDs 10 passes through the diffusion layer 17, light of uniform brightness is incident on the light incident surface of the light guide plate 13, and part of the light is incident on the reflection sheet 12, and is reflected to the light guide plate 13, and the light in the light guide plate 13 is reflected. After the dot reflection, the light is uniformly mixed in the light guide plate 13 by multiple reflections or the like, so that the brightness of the light emitted from the light emitting surface of the light guide plate 13 is more uniform. The light emitted from the light emitting surface of the light guide plate 13 is processed by diffusion and aggregation of the optical film 14, and the brightness is more uniform. The light emitted from the light guide plate 13 is sequentially processed through a lower diffusion sheet (not shown), a lower prism sheet (not shown), an upper prism sheet (not shown), and an upper diffusion sheet (not shown) to make the brightness of the light emitted by the backlight module 100 is more uniform.

The diffusion layer 17 includes a first diffusion layer and a second diffusion layer, the first diffusion layer is disposed between the light emitting surface of each of the LEDs 10 and the second diffusion layer, the first diffusion layer includes first light diffusion particles each having a first diameter, the second diffusion layer includes second light diffusion particles each having a second diameter, the first diameter is greater than the second diameter, the first diameter is a diameter of a minimum sphere corresponding to the first light diffusion particle, and the second diameter is a diameter of a minimum sphere corresponding to the second light diffusion particle. After the light emitted by the LEDs 10 is diffused by the first light diffusion particles having the first diameter and having a smaller specific surface area, the distribution angle of the light is initially increased and the brightness of the different directions is initially uniformized, and then the specific surface area is larger. The second light diffusion particles having the second diameter are further diffused, the distribution angle of the light is further increased, and the brightness of the different directions is further uniformized, the dark areas between the adjacent two LEDs 10 disappear, and the brightness of the light incident into the light guide plate 13 at each angle is uniform.

The first diffusion layer includes a first transparent adhesive and first light diffusion particles each having a first diameter, and the second diffusion layer includes a second transparent adhesive and second light diffusion particles each having a second diameter. A ratio of a refractive index of the first transparent adhesive to a refractive index of the first light diffusion particles is greater than a refractive index of the second transparent adhesive and a refractive index of the second light diffusion particles to further increase a light diffusion performance of the diffusion layer 17. The refractive index of the first diffusion particles and the refractive index of the second diffusion particles may be the same or different. Both the first diffusion particles and the second diffusion particles are organic light diffusion particles, which are advantageous for increasing the transmittance of light emitted from the LEDs 10 in the diffusion layer 17. The refractive index of the first transparent adhesive is greater than the refractive index of the second transparent adhesive, so that the light emitted by the LEDs has a good diffusion performance in the diffusion layer 17, and the transmittance of the light in the diffusion layer 17 is improved.

The diffusion layer 17 includes a transparent adhesive and light diffusing particles. The light diffusing particles include organic light diffusion particles and inorganic light diffusion particles, the organic light diffusion particles have good light transmittance, and light is refracted, reflected, and scattered between the organic light diffusion particles and the transparent adhesive to cause that the light emitted by the LED 10 is diffused, and the light emitted from the LED has a high transmittance in the diffusion layer 17. The inorganic light diffusion particles have good thermal conductivity, this avoids high temperature during operation of the LEDs 10, avoids high temperature of the diffusion layer 17, and avoids affecting the diffusion performance of the diffusion layer 17 on the light emitted by the LEDs 10. Light also refracts, reflects, and scatters between the inorganic light diffusion particles and the transparent adhesive. That is, the light diffusion particles include organic light diffusion particles and inorganic light diffusion particles, so that the light emitted from the LEDs has a large distribution angle and better uniformity of brightness, and the light emitted by the LEDs passes through the diffusion layer 17 with high light transmittance. Moreover, the bad effect of the diffusion layer 17 can be avoided by avoiding a high LED temperature. The transparent adhesive is at least one selected from a group consisting of epoxy resins and silicones. The organic light diffusion particles are at least one selected from a group consisting of acrylates, silicones, and polyethylenes, and the inorganic light diffusion particles are at least one selected from a group consisting of barium sulfate, silica, and calcium carbonate.

A size of the organic light diffusion particles is greater than a size of the inorganic light diffusion particles. The size of the inorganic light diffusion particles is on the order of nanometers, and the size of the organic light diffusion particles is on the order of micrometers. In the diffusion layer 17, a number of organic light diffusion particles is greater than a number of inorganic light diffusion particles to ensure that the diffusion layer 17 has a good diffusion performance on the light emitted from the LEDs 10, and further increases the transmittance of the light through the diffusion layer 17.

Further, a ratio of the refractive index of the transparent adhesive to the refractive index of the organic light diffusion particles ranges from 1.05 to 1.08, this avoids the large refractive index of the transparent adhesive and avoids the light emitted by the LEDs 10 to be totally reflected at the interface between the transparent adhesive and the air. The light transmittance of the light passing through the diffusion layer 17 is prevented from being too small, and the light flux reaching the light guide plate 13 is also prevented from being small. Specifically, the transparent adhesive is an epoxy resin, and the organic light diffusion particles are silicone particles.

Further, the ratio of the refractive index of the transparent adhesive to the refractive index of the inorganic light diffusion particles ranges from 0.93 to 0.98 to ensure further improvement of light reflection and scattering between the inorganic light diffusion particles and the transparent adhesive. As a result, the diffusion effect of the diffusion layer 17 on the light emitted from the plurality of LEDs 10 is further improved. Specifically, the transparent adhesive is silicone, and the inorganic light diffusion particles are nano calcium carbonate.

The present application further provides a liquid crystal display device including the backlight module and a liquid crystal display panel. The liquid crystal display panel is disposed on a side of the light emitting surface of the backlight module.

Beneficial effects of an embodiment of the present disclosure are that, the liquid crystal display device is provided by forming a diffusion layer on a light emitting surface of each of a plurality of LEDs, a distribution angle of light emitted by the LEDs is increased, and a brightness of light emitted from each direction of the LEDs is more uniform, this reaches a transition of the LEDs from a point source to a line source, eliminates a dark area between adjacent two LEDs, so that light entering a light guide plate is the same brightness light, thereby avoiding misalignment between the LEDs and the light guide plate, and also avoiding a LED light path and a light shadow generated by deformation of a reflection sheet, so as to enable the backlight module to emit light of uniform brightness, thereby improving display performance of the liquid crystal display device.

The description of the above embodiments is only for helping to understand the technical solutions of the present application and the core ideas thereof. It should be understood by those skilled in the art that the technical solutions described in the foregoing embodiments may be modified, or some of the technical features may be equivalently replaced. The modifications and substitutions do not depart from the scope of the technical solutions of the embodiments of the present application.

What is claimed is:

1. A backlight module, comprising:
a plurality of light emitting diodes (LEDs) each having a light emitting surface, and wherein the light emitting surface of each of the LEDs is provided with a diffusion layer;
wherein the diffusion layer comprises a first diffusion layer and a second diffusion layer, the first diffusion layer is disposed between the light emitting surface of each of the LEDs and the second diffusion layer, the first diffusion layer comprises first light diffusion particles each having a first diameter, the second diffusion layer comprises second light diffusion particles each having a second diameter, the first diameter is greater than the second diameter, the first diameter is a diameter of a minimum sphere corresponding to the first light diffusion particle, and the second diameter is a diameter of a minimum sphere corresponding to the second light diffusion particle;

wherein the first diffusion layer comprises a first transparent adhesive and first light diffusion particles each having a first diameter, the second diffusion layer comprises a second transparent adhesive and second light diffusion particles each having a second diameter, a ratio of a refractive index of the first transparent adhesive to a refractive index of the first light diffusion particles is greater than a refractive index of the second transparent adhesive and a refractive index of the second light diffusion particles, and the refractive index of the first transparent adhesive is greater than the refractive index of the second transparent adhesive.

2. The backlight module according to claim 1, wherein the diffusion layer comprises a transparent adhesive and light diffusion particles.

3. The backlight module according to claim 2, wherein the light diffusion particles comprise organic light diffusion particles and inorganic light diffusion particles.

4. The backlight module according to claim 3, wherein a ratio of a refractive index of the transparent adhesive to a refractive index of the organic light diffusion particles ranges from 1.05 to 1.08.

5. The backlight module according to claim 3, wherein a ratio of a refractive index of the transparent adhesive to a refractive index of the inorganic light diffusion particles ranges from 0.93 to 0.98.

6. The backlight module according to claim 3, wherein a number of the organic light diffusion particles is greater than a number of the inorganic light diffusion particles.

7. The backlight module according to claim 3, wherein the transparent adhesive is at least one selected from a group consisting of epoxy resins and silicones.

8. The backlight module according to claim 3, wherein the organic light diffusion particles are at least one selected from a group consisting of acrylates, silicones, and polyethylenes, and the inorganic light diffusion particles are at least one selected from a group consisting of barium sulfate, silica, and calcium carbonate.

9. The backlight module according to claim 1, wherein the backlight module is a side-lit backlight module.

10. A liquid crystal display device, comprising:
a backlight module, wherein the backlight module comprises a plurality of light emitting diodes (LEDs) each having a light emitting surface, and the light emitting surface of each of the LEDs is provided with a diffusion layer;
wherein the diffusion layer comprises a first diffusion layer and a second diffusion layer, the first diffusion layer is disposed between the light emitting surface of each of the LEDs and the second diffusion layer, the first diffusion layer comprises first light diffusion particles each having a first diameter, the second diffusion layer comprises second light diffusion particles each having a second diameter, the first diameter is greater than the second diameter, the first diameter is a diameter of a minimum sphere corresponding to the first light diffusion particle, and the second diameter is a diameter of a minimum sphere corresponding to the second light diffusion particle;
wherein the first diffusion layer comprises a first transparent adhesive and first light diffusion particles each having a first diameter, the second diffusion layer comprises a second transparent adhesive and second light diffusion particles each having a second diameter, a ratio of a refractive index of the first transparent adhesive to a refractive index of the first light diffusion particles is greater than a refractive index of the second transparent adhesive and a refractive index of the second light diffusion particles, and the refractive index of the first transparent adhesive is greater than the refractive index of the second transparent adhesive.

11. The liquid crystal display device according to claim 10, wherein the diffusion layer comprises a transparent adhesive and light diffusion particles.

12. The liquid crystal display device according to claim 11, wherein the light diffusion particles comprise organic light diffusion particles and inorganic light diffusion particles.

13. The liquid crystal display device according to claim 12, wherein a ratio of a refractive index of the transparent adhesive to a refractive index of the organic light diffusion particles ranges from 1.05 to 1.08.

14. The liquid crystal display device according to claim 12, wherein a ratio of a refractive index of the transparent adhesive to a refractive index of the inorganic light diffusion particles ranges from 0.93 to 0.98.

15. The liquid crystal display device according to claim 12, wherein a number of the organic light diffusion particles is greater than a number of the inorganic light diffusion particles.

16. The liquid crystal display device according to claim 12, wherein the transparent adhesive is at least one selected from a group consisting of epoxy resins and silicones.

17. The liquid crystal display device according to claim 12, wherein the organic light diffusion particles are at least one selected from a group consisting of acrylates, silicones, and polyethylenes, and the inorganic light diffusion particles are at least one selected from a group consisting of barium sulfate, silica, and calcium carbonate.

18. The liquid crystal display device according to claim 10, wherein the backlight module is a side-lit backlight module.

* * * * *